(12) United States Patent
Hamza

(10) Patent No.: US 8,488,846 B2
(45) Date of Patent: Jul. 16, 2013

(54) EXPEDIENT ENCODING SYSTEM

(75) Inventor: Rida M. Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/250,608

(22) Filed: Sep. 30, 2011

(65) Prior Publication Data
US 2012/0020534 A1    Jan. 26, 2012

Related U.S. Application Data

(60) Division of application No. 11/681,662, filed on Mar. 2, 2007, now Pat. No. 8,045,764, which is a continuation-in-part of application No. 11/275,703, filed on Jan. 25, 2006, now Pat. No. 7,593,550, and a continuation-in-part of application No. 11/043,366, filed on Jan. 26, 2005, now Pat. No. 7,756,301, and a continuation-in-part of application No. 11/372,854, filed on Mar. 10, 2006, and a continuation-in-part of application No. 11/672,108, filed on Feb. 7, 2007, now Pat. No. 8,090,157, and a continuation-in-part of application No. 11/675,424, filed on Feb. 15, 2007, now Pat. No. 8,098,901, and a continuation-in-part of application No. 11/681,614, filed on Mar. 2, 2007, now Pat. No. 8,050,463.

(60) Provisional application No. 60/778,770, filed on Mar. 3, 2006, provisional application No. 60/647,270, filed on Jan. 26, 2005.

(51) Int. Cl.
*G06K 9/00*    (2006.01)

(52) U.S. Cl.
USPC ........................................................ 382/117

(58) Field of Classification Search
USPC ...................... 382/115, 117, 118, 232–253
See application file for complete search history.

(56) References Cited

U.S. PATENT DOCUMENTS

| | | |
|---|---|---|
| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |

(Continued)

FOREIGN PATENT DOCUMENTS

| | | |
|---|---|---|
| EP | 0484076 | 5/1992 |
| EP | 0593386 | 4/1994 |

(Continued)

OTHER PUBLICATIONS

Yingzi Du et al. "A One-Dimensional Approach for Iris Identification" I.E.E.E. pp. 1-11, Jan. 25, 2006.*

(Continued)

*Primary Examiner* — Brian Le
(74) *Attorney, Agent, or Firm* — Seager Tufte & Wickhem LLC

(57) ABSTRACT

An encoding system for an iris recognition system. In particular, it presents a robust encoding method of the iris textures to compress the iris pixel information into few bits that constitute the iris barcode to be stored or matched against database templates of same form. The iris encoding system is relied on to extract key bits of information under various conditions of capture, such as illumination, obscuration or eye illuminations variations.

7 Claims, 9 Drawing Sheets

U.S. PATENT DOCUMENTS

| | | |
|---|---|---|
| 5,293,427 A | 3/1994 | Ueno et al. |
| 5,359,382 A | 10/1994 | Uenaka |
| 5,404,013 A | 4/1995 | Tajima |
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsushita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzuki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 * | 9/2003 | Suzaki et al. ................ 382/117 |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,711,562 B1 | 3/2004 | Ross et al. |
| 6,714,665 B1 | 3/2004 | Hanna et al. |
| 6,718,049 B2 | 4/2004 | Pavlidis et al. |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 | 6/2004 | Ford |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,479 B2 | 1/2005 | Park |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,972,797 B2 | 12/2005 | Izumi |
| 6,992,562 B2 | 1/2006 | Fuks et al. |
| 6,996,281 B2 * | 2/2006 | Boliek et al. ................ 382/236 |
| 7,053,948 B2 | 5/2006 | Konishi |
| 7,071,971 B2 | 7/2006 | Elberbaum |
| 7,084,904 B2 | 8/2006 | Liu et al. |
| 7,136,581 B2 | 11/2006 | Fujii |
| 7,183,895 B2 | 2/2007 | Bazakos et al. |
| 7,184,577 B2 | 2/2007 | Chen et al. |
| 7,197,173 B2 | 3/2007 | Jones et al. |
| 7,204,425 B2 | 4/2007 | Mosher, Jr. et al. |
| 7,277,561 B2 | 10/2007 | Shin |
| 7,277,891 B2 | 10/2007 | Howard et al. |
| 7,298,873 B2 | 11/2007 | Miller, Jr. et al. |
| 7,315,233 B2 | 1/2008 | Yuhara |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 | 4/2008 | Kahn et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,443,441 B2 | 10/2008 | Hiraoka |
| 7,460,693 B2 | 12/2008 | Loy et al. |
| 7,471,451 B2 | 12/2008 | Dent et al. |
| 7,486,806 B2 | 2/2009 | Azuma et al. |

| Patent No. | Date | Name |
|---|---|---|
| 7,518,651 B2 | 4/2009 | Butterworth |
| 7,538,326 B2 | 5/2009 | Johnson et al. |
| 7,542,945 B2 | 6/2009 | Thompson et al. |
| 7,580,620 B2 | 8/2009 | Raskar et al. |
| 7,593,550 B2 | 9/2009 | Hamza |
| 7,637,568 B2 | 12/2009 | Meeker et al. |
| 7,639,846 B2 | 12/2009 | Yoda |
| 7,722,461 B2 | 5/2010 | Gatto et al. |
| 7,751,598 B2 | 7/2010 | Matey et al. |
| 7,756,301 B2 | 7/2010 | Hamza |
| 7,756,407 B2 | 7/2010 | Raskar |
| 7,761,453 B2 | 7/2010 | Hamza |
| 7,777,802 B2 | 8/2010 | Shinohara et al. |
| 7,804,982 B2 | 9/2010 | Howard et al. |
| 8,045,764 B2 | 10/2011 | Hamza |
| 2001/0026632 A1 | 10/2001 | Tamai |
| 2001/0027116 A1 | 10/2001 | Baird |
| 2001/0047479 A1 | 11/2001 | Bromba et al. |
| 2001/0051924 A1 | 12/2001 | Uberti |
| 2001/0054154 A1 | 12/2001 | Tam |
| 2002/0010857 A1 | 1/2002 | Karthik |
| 2002/0033896 A1 | 3/2002 | Hatano |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0077841 A1 | 6/2002 | Thompson |
| 2002/0089157 A1 | 7/2002 | Breed et al. |
| 2002/0106113 A1 | 8/2002 | Park |
| 2002/0112177 A1 | 8/2002 | Voltmer et al. |
| 2002/0114495 A1 | 8/2002 | Chen et al. |
| 2002/0118864 A1 * | 8/2002 | Kondo et al. ............... 382/117 |
| 2002/0130961 A1 | 9/2002 | Lee et al. |
| 2002/0131622 A1 | 9/2002 | Lee et al. |
| 2002/0139842 A1 | 10/2002 | Swaine |
| 2002/0140715 A1 | 10/2002 | Smet |
| 2002/0142844 A1 | 10/2002 | Kerr |
| 2002/0144128 A1 | 10/2002 | Rahman et al. |
| 2002/0150281 A1 | 10/2002 | Cho |
| 2002/0154794 A1 | 10/2002 | Cho |
| 2002/0158750 A1 | 10/2002 | Almalik |
| 2002/0164054 A1 | 11/2002 | McCartney et al. |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0014372 A1 | 1/2003 | Wheeler et al. |
| 2003/0020828 A1 | 1/2003 | Ooi et al. |
| 2003/0038173 A1 | 2/2003 | Blackson et al. |
| 2003/0046228 A1 | 3/2003 | Berney |
| 2003/0053663 A1 | 3/2003 | Chen et al. |
| 2003/0055689 A1 | 3/2003 | Block et al. |
| 2003/0055787 A1 | 3/2003 | Fujii |
| 2003/0058492 A1 | 3/2003 | Wakiyama |
| 2003/0061172 A1 | 3/2003 | Robinson |
| 2003/0061233 A1 | 3/2003 | Manasse et al. |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0076161 A1 | 4/2003 | Tisse |
| 2003/0076300 A1 | 4/2003 | Lauper et al. |
| 2003/0076984 A1 | 4/2003 | Tisse et al. |
| 2003/0080194 A1 | 5/2003 | O'Hara et al. |
| 2003/0091215 A1 | 5/2003 | Lauper et al. |
| 2003/0092489 A1 | 5/2003 | Veradej |
| 2003/0095689 A1 | 5/2003 | Volkommer et al. |
| 2003/0098776 A1 | 5/2003 | Friedli |
| 2003/0099379 A1 | 5/2003 | Monk et al. |
| 2003/0099381 A1 | 5/2003 | Ohba |
| 2003/0103652 A1 | 6/2003 | Lee et al. |
| 2003/0107097 A1 | 6/2003 | McArthur et al. |
| 2003/0107645 A1 | 6/2003 | Yoon |
| 2003/0108224 A1 | 6/2003 | Ike |
| 2003/0108225 A1 | 6/2003 | Li |
| 2003/0115148 A1 | 6/2003 | Takhar |
| 2003/0115459 A1 | 6/2003 | Monk |
| 2003/0116630 A1 | 6/2003 | Carey et al. |
| 2003/0118212 A1 | 6/2003 | Min et al. |
| 2003/0118217 A1 | 6/2003 | Kondo et al. |
| 2003/0123711 A1 | 7/2003 | Kim et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0131265 A1 | 7/2003 | Bhakta |
| 2003/0133597 A1 | 7/2003 | Moore et al. |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0152252 A1 | 8/2003 | Kondo et al. |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0169901 A1 | 9/2003 | Pavlidis et al. |
| 2003/0169907 A1 | 9/2003 | Edwards et al. |
| 2003/0173408 A1 | 9/2003 | Mosher, Jr. et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0189480 A1 | 10/2003 | Hamid |
| 2003/0189481 A1 | 10/2003 | Hamid |
| 2003/0191949 A1 | 10/2003 | Odagawa |
| 2003/0194112 A1 | 10/2003 | Lee |
| 2003/0195935 A1 | 10/2003 | Leeper |
| 2003/0198368 A1 | 10/2003 | Kee |
| 2003/0200180 A1 | 10/2003 | Phelan, III et al. |
| 2003/0210139 A1 | 11/2003 | Brooks et al. |
| 2003/0210802 A1 | 11/2003 | Schuessler |
| 2003/0218719 A1 | 11/2003 | Abourizk et al. |
| 2003/0225711 A1 | 12/2003 | Paping |
| 2003/0228898 A1 | 12/2003 | Rowe |
| 2003/0233556 A1 | 12/2003 | Angelo et al. |
| 2003/0235326 A1 | 12/2003 | Morikawa et al. |
| 2003/0235411 A1 | 12/2003 | Morikawa et al. |
| 2003/0236120 A1 | 12/2003 | Reece et al. |
| 2004/0001614 A1 | 1/2004 | Russon et al. |
| 2004/0002894 A1 | 1/2004 | Kocher |
| 2004/0005078 A1 | 1/2004 | Tillotson |
| 2004/0006553 A1 | 1/2004 | de Vries et al. |
| 2004/0010462 A1 | 1/2004 | Moon et al. |
| 2004/0012760 A1 | 1/2004 | Mihashi et al. |
| 2004/0019570 A1 | 1/2004 | Bolle et al. |
| 2004/0023664 A1 | 2/2004 | Mirouze et al. |
| 2004/0023709 A1 | 2/2004 | Beaulieu et al. |
| 2004/0025030 A1 | 2/2004 | Corbett-Clark et al. |
| 2004/0025031 A1 | 2/2004 | Ooi et al. |
| 2004/0025053 A1 | 2/2004 | Hayward |
| 2004/0029564 A1 | 2/2004 | Hodge |
| 2004/0030930 A1 | 2/2004 | Nomura |
| 2004/0035123 A1 | 2/2004 | Kim et al. |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0049687 A1 | 3/2004 | Orsini et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0104266 A1 | 6/2004 | Bolle et al. |
| 2004/0117636 A1 | 6/2004 | Cheng |
| 2004/0133804 A1 | 7/2004 | Smith et al. |

| | | |
|---|---|---|
| 2004/0146187 A1 | 7/2004 | Jeng |
| 2004/0148526 A1 | 7/2004 | Sands et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0169817 A1 | 9/2004 | Grotehusmann et al. |
| 2004/0172541 A1 | 9/2004 | Ando et al. |
| 2004/0174070 A1 | 9/2004 | Voda et al. |
| 2004/0190759 A1 | 9/2004 | Caldwell |
| 2004/0193893 A1 | 9/2004 | Braithwaite et al. |
| 2004/0219902 A1 | 11/2004 | Lee et al. |
| 2004/0233038 A1 | 11/2004 | Beenau et al. |
| 2004/0240711 A1 | 12/2004 | Hamza et al. |
| 2004/0252866 A1 | 12/2004 | Tisse et al. |
| 2004/0255168 A1 | 12/2004 | Murashita et al. |
| 2005/0008200 A1 | 1/2005 | Azuma et al. |
| 2005/0008201 A1 | 1/2005 | Lee et al. |
| 2005/0012817 A1 | 1/2005 | Hampapur et al. |
| 2005/0029353 A1 | 2/2005 | Isemura et al. |
| 2005/0052566 A1 | 3/2005 | Kato |
| 2005/0055582 A1 | 3/2005 | Bazakos et al. |
| 2005/0063567 A1 | 3/2005 | Saitoh et al. |
| 2005/0084137 A1 | 4/2005 | Kim et al. |
| 2005/0084179 A1 | 4/2005 | Hanna et al. |
| 2005/0099288 A1 | 5/2005 | Spitz et al. |
| 2005/0102502 A1 | 5/2005 | Sagen |
| 2005/0110610 A1 | 5/2005 | Bazakos et al. |
| 2005/0125258 A1 | 6/2005 | Yellin et al. |
| 2005/0127161 A1 | 6/2005 | Smith et al. |
| 2005/0129286 A1 | 6/2005 | Hekimian |
| 2005/0134796 A1 | 6/2005 | Zelvin et al. |
| 2005/0138385 A1 | 6/2005 | Friedli et al. |
| 2005/0138387 A1 | 6/2005 | Lam et al. |
| 2005/0146640 A1 | 7/2005 | Shibata |
| 2005/0151620 A1 | 7/2005 | Neumann |
| 2005/0152583 A1 | 7/2005 | Kondo et al. |
| 2005/0193212 A1 | 9/2005 | Yuhara |
| 2005/0199708 A1 | 9/2005 | Friedman |
| 2005/0206501 A1 | 9/2005 | Farhat |
| 2005/0206502 A1 | 9/2005 | Bernitz |
| 2005/0207614 A1 | 9/2005 | Schonberg et al. |
| 2005/0210267 A1 | 9/2005 | Sugano et al. |
| 2005/0210270 A1 | 9/2005 | Rohatgi et al. |
| 2005/0210271 A1 | 9/2005 | Chou et al. |
| 2005/0238214 A1 | 10/2005 | Matsuda et al. |
| 2005/0240778 A1 | 10/2005 | Saito |
| 2005/0248725 A1 | 11/2005 | Ikoma et al. |
| 2005/0249385 A1 | 11/2005 | Kondo et al. |
| 2005/0255840 A1 | 11/2005 | Markham |
| 2006/0093190 A1 | 5/2006 | Cheng et al. |
| 2006/0147094 A1 | 7/2006 | Yoo |
| 2006/0165266 A1 | 7/2006 | Hamza |
| 2006/0274919 A1 | 12/2006 | LoIacono et al. |
| 2007/0036397 A1 | 2/2007 | Hamza |
| 2007/0140531 A1 | 6/2007 | Hamza |
| 2007/0160266 A1 | 7/2007 | Jones et al. |
| 2007/0189582 A1 | 8/2007 | Hamza et al. |
| 2007/0206840 A1 | 9/2007 | Jacobson |
| 2007/0211924 A1 | 9/2007 | Hamza |
| 2007/0274570 A1 | 11/2007 | Hamza |
| 2007/0286590 A1 | 12/2007 | Terashima |
| 2008/0005578 A1 | 1/2008 | Shafir |
| 2008/0075334 A1 | 3/2008 | Determan et al. |
| 2008/0075441 A1 | 3/2008 | Jelinek et al. |
| 2008/0104415 A1 | 5/2008 | Palti-Wasserman et al. |
| 2008/0148030 A1 | 6/2008 | Goffin |
| 2008/0211347 A1 | 9/2008 | Wright et al. |
| 2008/0252412 A1 | 10/2008 | Larsson et al. |
| 2008/0267456 A1 | 10/2008 | Anderson |
| 2009/0046899 A1 | 2/2009 | Northcott et al. |
| 2009/0092283 A1 | 4/2009 | Whillock et al. |
| 2009/0316993 A1 | 12/2009 | Brasnett et al. |
| 2010/0002913 A1 | 1/2010 | Hamza |
| 2010/0033677 A1 | 2/2010 | Jelinek |
| 2010/0034529 A1 | 2/2010 | Jelinek |
| 2010/0142765 A1 | 6/2010 | Hamza |
| 2010/0182440 A1 | 7/2010 | McCloskey |
| 2010/0239119 A1 | 9/2010 | Bazakos et al. |
| 2010/0315500 A1 | 12/2010 | Whillock et al. |
| 2010/0316263 A1 | 12/2010 | Hamza |
| 2011/0187845 A1 | 8/2011 | Bazakos et al. |
| 2011/0298912 A1 | 12/2011 | Jelinek et al. |
| 2012/0056714 A1 | 3/2012 | Whillock et al. |

FOREIGN PATENT DOCUMENTS

| | | |
|---|---|---|
| EP | 0878780 | 11/1998 |
| EP | 0899680 | 3/1999 |
| EP | 0910986 | 4/1999 |
| EP | 0962894 | 12/1999 |
| EP | 1018297 | 7/2000 |
| EP | 1024463 | 8/2000 |
| EP | 1028398 | 8/2000 |
| EP | 1041506 | 10/2000 |
| EP | 1041523 | 10/2000 |
| EP | 1126403 | 8/2001 |
| EP | 1139270 | 10/2001 |
| EP | 1237117 | 9/2002 |
| EP | 1477925 | 11/2004 |
| EP | 1635307 | 3/2006 |
| GB | 2369205 | 5/2002 |
| GB | 2371396 | 7/2002 |
| GB | 2375913 | 11/2002 |
| GB | 2402840 | 12/2004 |
| GB | 2411980 | 9/2005 |
| JP | 9161135 | 6/1997 |
| JP | 9198545 | 7/1997 |
| JP | 9201348 | 8/1997 |
| JP | 9147233 | 9/1997 |
| JP | 9234264 | 9/1997 |
| JP | 9305765 | 11/1997 |
| JP | 9319927 | 12/1997 |
| JP | 10021392 | 1/1998 |
| JP | 10040386 | 2/1998 |
| JP | 10049728 | 2/1998 |
| JP | 10137219 | 5/1998 |
| JP | 10137221 | 5/1998 |
| JP | 10137222 | 5/1998 |
| JP | 10137223 | 5/1998 |
| JP | 10248827 | 9/1998 |
| JP | 10269183 | 10/1998 |
| JP | 11047117 | 2/1999 |
| JP | 11089820 | 4/1999 |
| JP | 11200684 | 7/1999 |
| JP | 11203478 | 7/1999 |
| JP | 11213047 | 8/1999 |
| JP | 11339037 | 12/1999 |
| JP | 2000005149 | 1/2000 |
| JP | 2000005150 | 1/2000 |
| JP | 2000011163 | 1/2000 |
| JP | 2000023946 | 1/2000 |
| JP | 2000083930 | 3/2000 |
| JP | 2000102510 | 4/2000 |
| JP | 2000102524 | 4/2000 |
| JP | 2000105830 | 4/2000 |
| JP | 2000107156 | 4/2000 |
| JP | 2000139878 | 5/2000 |
| JP | 2000155863 | 6/2000 |
| JP | 2000182050 | 6/2000 |
| JP | 2000185031 | 7/2000 |
| JP | 2000194972 | 7/2000 |
| JP | 2000237167 | 9/2000 |
| JP | 2000242788 | 9/2000 |
| JP | 2000259817 | 9/2000 |
| JP | 2000356059 | 12/2000 |
| JP | 2000357232 | 12/2000 |
| JP | 2001005948 | 1/2001 |
| JP | 2001067399 | 3/2001 |
| JP | 2001101429 | 4/2001 |
| JP | 2001167275 | 6/2001 |
| JP | 2001222661 | 8/2001 |
| JP | 2001292981 | 10/2001 |
| JP | 2001297177 | 10/2001 |
| JP | 2001358987 | 12/2001 |
| JP | 2002119477 | 4/2002 |
| JP | 2002133415 | 5/2002 |
| JP | 2002153444 | 5/2002 |
| JP | 2002153445 | 5/2002 |
| JP | 2002260071 | 9/2002 |

| | | |
|---|---|---|
| JP | 2002271689 | 9/2002 |
| JP | 2002286650 | 10/2002 |
| JP | 2002312772 | 10/2002 |
| JP | 2002329204 | 11/2002 |
| JP | 2003006628 | 1/2003 |
| JP | 2003036434 | 2/2003 |
| JP | 2003108720 | 4/2003 |
| JP | 2003108983 | 4/2003 |
| JP | 2003132355 | 5/2003 |
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

AOptix Technologies, "Introducing the AOptix InSight 2 Meter Iris Recognition System," 6 pages, 2010.
Avcibas et al., "Steganalysis Using Image Quality Metrics," IEEE Transactions on Image Processing, vol. 12, No. 2, pp. 221-229, Feb. 2003.
Belhumeur et al., "Eigenfaces Vs. Fisherfaces: Recognition Using Class Specific Linear Projection," 14 pages, prior to Jun. 11, 2010.
Bentley et al., "Multidimensional Binary Search Trees Used for Associative Searching," Communications of the ACM vol. 18, No. 9, pp. 509-517, Sep. 1975.
Blackman et al., "Chapter 9, Multiple Sensor Tracking: Issues and Methods," Design and Analysis of Modern Tracking Systems, Artech House, pp. 595-659, 1999.
Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.
Bonney et al., "Iris Pattern Extraction Using Bit Planes and Standard Deviations," IEEE, pp. 582-586, 2004.
Brasnett et al., "A Robust Visual Identifier Using the Trace Transform," 6 pages, prior to Jun. 11, 2010.
Buades et al., "A Review of Image Denoising Algorithms, with a New One," Multiscale Modeling & Simulation, vol. 4, No. 2, pp. 490-530, 2005.
Camus et al., "Reliable and Fast Eye Finding in Close-up Images," IEEE, pp. 389-394, 2002.
Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.
Chen et al., "Localized Iris Image; Quality Using 2-D Wavelets," LNCS vol. 3832, pp. 373-381, 2005.
Chow et al., "Towards a System for Automatic Facial Feature Detection," Pattern Recognition vol. 26, No. 12, pp. 1739-1755, 1993.
Cui et al., "A Fast and Robust Iris Localization Method Based on Texture Segmentation," 8 pages, 2004.
Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Cula et al., "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51., No. 12, pp. 2148-2159, 2004.

Cula et al., "Compact Representation of Bidirectional Texture Functions," Proceedings of IEEE Computer Society Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing, vol. 16, No. 8, pp. 2080-2095, Aug. 2007.

Dabov et al., "Image Restoration by Spars 3D Transform Collaborative Filtering," SPIE vol. 6812 681207-1, 12 pages, 2008.

Daugman, "Results From 200 Billion Iris Cross-Comparisons," University of Cambridge Computer Laboratory, Technical Report, No. 635, 8 pages, Jun. 2005.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "How Iris Recognition Works," IEEE 2002 International Conference on Image Processing, vol. I of III, 6 pages, Sep. 22-25, 2002.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Du et al., "A One-Dimensional Approach for Iris Identification," 11 pages, prior to Jan. 25, 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Freeboy, "Adaptive Optics Speeds Up Airport Immigration," Optics. org/ole, 2 pages, Jan. 2009.

Gan et al., "Applications of Wavelet Packets Decomposition in Iris Recognition," LNCS vol. 3832, pp. 443-449, 2005.

Guo et al., "A System for Automatic Iris Capturing," Mitsubishi Electric Research Laboratories, Inc., 10 pages, 2005.

Guo, "Face, Expression, and Iris Recognition Using Learning-Based Approaches," 132 pages, 2006.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_transform, "Radon Transform," 5 pages, printed May 14, 2010.

http://www.imagine-eyes.com/content/view/100/115/, "INOVEO—Ultra-High Resolution Retinal Imaging with Adaptive Optics," 2 pages, printed Feb. 22, 2010.

http://www.newscientisttech.com/article/dn11110-invention-covert-iris-sc, "Invention: Covert Iris Scanner," 3 pages, printed Feb. 8, 2007.

Huang et al., "Iris Model Based on Local Orientation Description," 5 pages, prior to Jan. 25, 2006.

Huang et al., "An Efficient Iris Recognition System," IEEE Proceedings of the First International Conference on Machine Learning; and Cybernetics, Beijing, pp. 450-454, Nov. 4-5, 2002.

Ivins et al., "A Deformable Model of the Human Iris for Measuring Small Three-Dimensional Eye Movements," Machine Vision and Applications, vol. 11, pp. 42-51, 1998.

Jalaja et al., "Texture Element Feature Characterizations for CBIR," IEEE, pp. 733-736, 2005.

John Daugmam et al., "How Iris Recognition Works,", IEEE Transactions on Circuits and Systems for Video Technology, vol. 14, No. 1, pp. 21-30, Jan. 2004.

Kadyrov et al., "The Trace Transform and Its Applications," IEEE Transactions on Pattern Analysis and Machine Intelligence, vol. 23, No. 8, pp. 811-828, Aug. 2001.

Kadyrov et al., "The Trace Transform as a Tool to Invariant Feature Construction," 3 pages, prior to Jun. 11, 2010.

Kalka et al., "Image Quality Assessment for Iris Biometric," Proc. of SPIE vol. 6202 62020D, 11 pages, 2006.

Kang et al., "Improved Dual Action Contour for Iris Recognition," 10 pages, prior to Jun. 11, 2010.

Kawaguchi et al., "Detection of Eyes from Human Faces by Hough Transform and Separability Filter," IEEE, 4 pages, 2000.

Ko et al., "Monitoring and Reporting of Fingerprint Image Quality and Match Accuracy for a Large User Application," IEEE Computer Society, Proceedings of the 33rd Applied Imagery Pattern Recognition Workshop, 6 pages, 2004.

Kong et al., "Detecting Eyelash and Reflection for Accurate Iris Segmentation," International Journal of Pattern Recognition and Artificial Intelligence, vol. 17, No. 6, pp. 1025-1034, 2003.

Lau et al., "Finding a Small Number of Regions in an Image Using Low-Level Features," Pattern Recognition 35, pp. 2323-2339, 2002.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Personal Identification Based on Iris Texture Analysis," IEEE Transactions on Pattern Analysis and Machine Intelligence, vol. 25, No. 12, pp. 1519-1533, Dec. 2003.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Symposium, ISVC 2007, 14 pages, 2007.

Masek, "Recognition of Human Iris Patterns for Biometric Identification," 61 pages, 2003.

Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.

Monro et al., "DCT-Based Iris Recognition," IEEE Transactions on Pattern Analysis and Machine Intelligence, vol. 29, No. 4, Apr. 2007.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Oppenheim et al, "The Importance of Phase in Signals," Proceedings of the IEEE, vol. 69, No. 5, pp. 529-541, 1981.

Pamudurthy et al., "Dynamic Approach for Face Recognition Using Digital Image Skin Correlation," Audio and Video Based Person Authentication 5th International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Large-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ratha et al., "A Real-Time Matching System for Large Fingerprint Databases," IEEE Transactions on Pattern Analysis, and Machine Intelligence, vol. 18, No. 8, pp. 799-812, Aug. 1996.

Ross et al., "Segmenting Non-Ideal Irises Using Geodesic Active Contours," IEEE 2006 Biometrics Symposium, 3 pages, 2006.

Seung-In Noh et al., "A Novel Method to Extract Features for Iris Recognition System," J.Kittler and M.S. Nixon (Eds): AVBPA 2003, LNCS 2688, pp. 862-868, 2203.

Shapiro et al., pp. 556-559 in Book Entitled "Computer Vision," Prentice Hall, prior to Jun. 11, 2010.

Sony, "Network Color Camera, SNC-RZ30N (NTSC)," 6 pages, Aug. 2002.

Stillman et al., "A System for Tracking and Recognizing Multiple People with Multiple Cameras," 6 pages, Aug. 1998.

Sun et al., "Robust Encoding of Local Ordinal Measures: A General Framework of Iris Recognition," 13 pages, prior to Jan. 25, 2006.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhenan Sun et al., "Iris Recognition Based on Non-local Comparisons," Sinobiometrics 2004, LNCS 3338, pp. 67-77, 2004.

Zhi-Hui et al., "Research Iris Serial Images Quality Assessment Method Based on HVS," Proceedings of SPIE, vol. 6034, 6 pages, 2006.

* cited by examiner

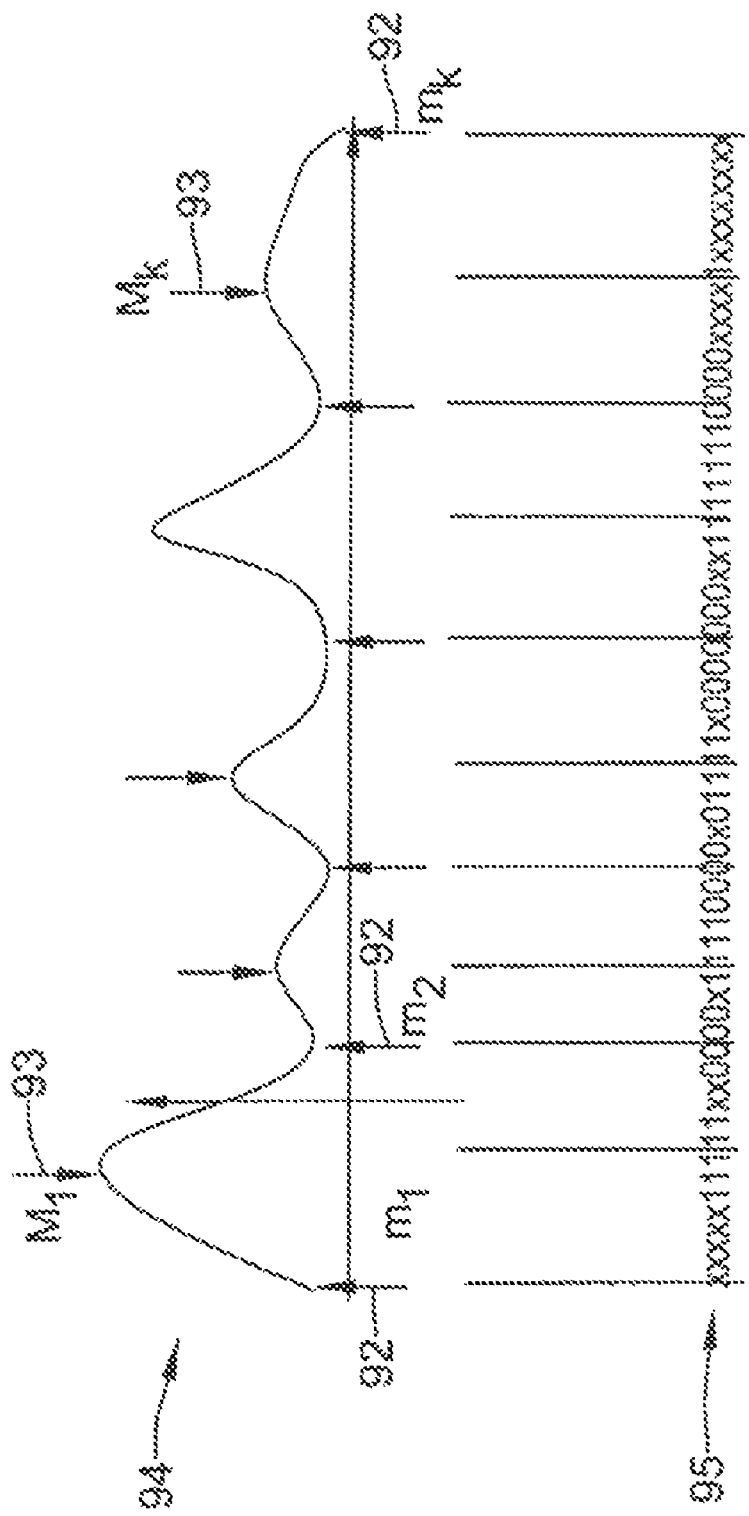

EXPEDIENT ENCODING SYSTEM

This application is a Divisional of U.S. patent application Ser. No. 11/681,662, filed Mar. 2, 2007, which claims the benefit of U.S. Provisional Application No. 60/778,770, filed Mar. 3, 2006.

This application is a Divisional of U.S. patent application Ser. No. 11/681,662, filed Mar. 2, 2007, which is a continuation-in-part of U.S. patent application Ser. No. 11/275,703, filed Jan. 25, 2006, which claims the benefit of U.S. Provisional Application No. 60/647,270, filed Jan. 26, 2005.

This application is a Divisional of U.S. patent application Ser. No. 11/681,662, filed Mar. 2, 2007, which is a continuation-in-part of U.S. patent application Ser. No. 11/043,366, filed Jan. 26, 2005.

This application is a Divisional of U.S. patent application Ser. No. 11/681,662, filed Mar. 2, 2007, which is a continuation-in-part of U.S. patent application Ser. No. 11/372,854, filed Mar. 10, 2006;

This application is a Divisional of U.S. patent application Ser. No. 11/681,662, filed Mar. 2, 2007, which is a continuation-in-part of U.S. patent application Ser. No. 11/672,108, filed Feb. 7, 2007.

This application is a Divisional of U.S. patent application Ser. No. 11/681,662, filed Mar. 2, 2007, which is a continuation-in-part of U.S. patent application Ser. No. 11/675,424, filed Feb. 15, 2007.

This application is a Divisional of U.S. patent application Ser. No. 11/681,662, filed Mar. 2, 2007, which is a continuation-in-part of U.S. patent application Ser. No. 11/681,614, filed Mar. 2, 2007.

U.S. patent application Ser. No. 11/681,662, filed Mar. 2, 2007, is hereby incorporated by reference.

The government may have rights in the present invention.

BACKGROUND

The present invention pertains to recognition systems and particularly to biometric recognition systems. More particularly, the invention pertains to iris recognition systems.

Related applications may include U.S. patent application Ser. No. 10/979,129, filed Nov. 3, 2004, which is a continuation-in-part of U.S. patent application Ser. No. 10/655,124, filed Sep. 5, 2003; and U.S. patent application Ser. No. 11/382,373, filed May 9, 2006, which are hereby incorporated by reference.

U.S. Provisional Application No. 60/778,770, filed Mar. 3, 2006, is hereby incorporated by reference.

U.S. patent application Ser. No. 11/275,703, filed Jan. 25, 2006, is hereby incorporated by reference.

U.S. Provisional Application No. 60/647,270, filed Jan. 26, 2005, is hereby incorporated by reference.

U.S. patent application Ser. No. 11/043,366, filed Jan. 26, 2005, is hereby incorporated by reference.

U.S. patent application Ser. No. 11/372,854, filed Mar. 10, 2006, is hereby incorporated by reference.

U.S. patent application Ser. No. 11/672,108, filed Feb. 7, 2007, is hereby incorporated by reference.

U.S. patent application Ser. No. 11/675,424, filed Feb. 15, 2007 is hereby incorporated by reference.

U.S. patent application Ser. No. 11/681,614, filed Mar. 2, 2007 is hereby incorporated by reference.

SUMMARY

The present invention pertains to the iris recognition technology and human authentication methods. Iris patterns are proven to be unique and stable. The success of iris recognition system lies in using appropriate representations scheme of these unique iris patterns. This invention is about the representation of iris patterns extracted from the iris map. In particular, it presents a robust encoding method of the iris textures to compress the iris pixel information into few bits that constitute the iris barcode to be stored or matched against database templates of same form. The iris encoding method is reliable to extract key bits of information under various conditions of capture, such as illumination, obscuration or eye illuminations variations.

BRIEF DESCRIPTION OF THE DRAWING

FIGS. 8a and 8b are diagrams illustrating an encoding scheme with binning of a barcode based on minima and maxima of signals.

DESCRIPTION

The present system may relate to biometrics, an iris recognition system, image metrics, authentication, access control, monitoring, identification, and security and surveillance systems. The present system addresses processing procedure of iris encoding to support in development of improved iris recognition systems. The present system may provide methods to compress the extracted normalized iris map image into a compact bit representation of the iris pixels while preserving the key iris pattern information. This compact representation of iris may be computed to execute an accurate matching and enrollment.

Figure 1:
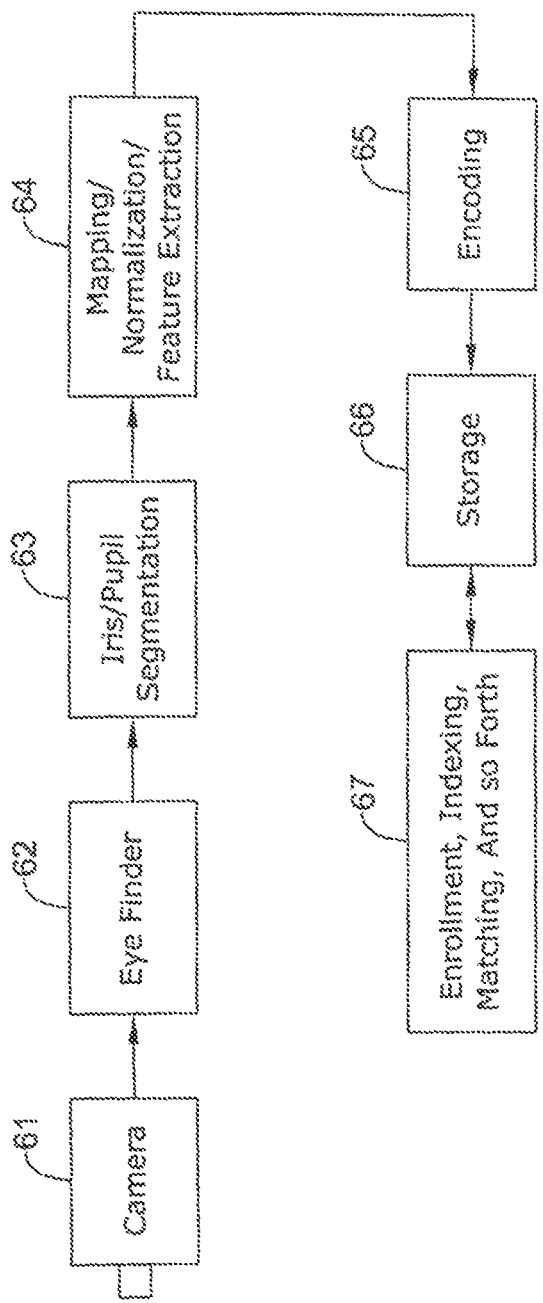
FIG. 1 is a diagram of an overall iris recognition system.

The overall eye detection system is shown in FIG. 1. It shows a camera 61 that may provide an image with a face in it to the eye finder 62 as noted herein. The eyefinder 62 may provide an image of one or two eyes that go to the iris segmentation block 63. A polar segmentation (POSE) system in block 63 may be used to perform the segmentation. POSE may be based on the assumption that image (e.g., 320×240 pixels) has a visible pupil where iris can be partially visible. There may be pupil segmentation at the inner border between the iris and pupil and segmentation at the outer border between the iris and the sclera and iris and eyelids. An output having a segmented image may go to a block 64 for mapping/normalization and feature extraction. An output from block 64 may go to an encoding block 65 which may provide an output, such as a barcode of the images to block put in terms of ones and zeros. The coding of the images may provide a basis for storage in block 66 of the eye information which may be used for enrolling, indexing, matching, and so on, at block 67, of the eye information, such as that of the iris and pupil, related to the eye.

One may extract and encode the most discriminating information present in an iris pattern. Just significant features of the iris texture are encoded so that comparisons between templates may be made faster and more reliable. Many iris recognition systems might use a band pass decomposition of the iris image using two-dimensional (2D) modulated filters with multiple parameter dependencies. A present simplified 1D phase-based encoding approach may use a single periodic filter configured by a single parameter.

The present approach may be staged into multiple steps to extract features at different central frequencies and at different phasor quantizations. The approach may compress an iris pattern into fewer bits to an extent to make a match without having to compute all bits (minimum savings may reach fifty percent relative to the bit count of other approaches), thus allowing for efficient storage and fast comparison of large iris databases. In addition, the present encoder may be an extension to what is implemented to segment the iris boundaries, and thus some of the approach may be executed at an early stage during segmentation to save on the computation load.

A key component of iris recognition system may be an encoding scheme to extract the key features of the iris texture into fewer bits which are then used to match the subjects. The matching may be significantly influenced by many factors including the segmentation, feature extraction, and spatial resolution and image quality.

The present approach may extract and encode the most discriminating information present in an iris pattern. The present feature extraction and encoding scheme may be embedded within one-dimensional polar segmentation (1D POSE) and thus reduce sources of errors and allow for staged matching for fast iris indexing. Just the significant features of the iris texture are to be encoded so that comparisons between templates may be made unbiased. Many other iris recognition systems may use a band pass decomposition of the iris image using a 2D Gabor (i.e., a modulated sine and cosine waves with a Gaussian function) or in general wavelet functions to create a biometric template.

Wavelets may be used to decompose the data in the iris map into components that presented at different levels of resolution. A number of wavelet filters may often be applied to a 2D iris map at multi-resolution levels to extract localized features in spectral and spatial domains, and allow matching at multilevel resolutions.

Gabor or log-Gabor filters (somewhat popular in iris recognition systems) appear to be simply subsets of wavelet functions and may be able to provide conjoint representations of the features in space and spatial frequency. These techniques might be effective in extracting the iris features; however, their implementation and configurations appear to involve multiple parameter settings and other computational burdens. While the current implementations of iris encoding may be well represented by any wavelet function or 2D Gabor functions, the Gabor decomposition is difficult to compute and lacks some of the mathematical conveniences that are desired for good implementations, such as not being invertible, non-linear reconstruction, and maltreatment of DC components.

The present encoder may incorporate 1D encoding, a single filter to extract phase information, and a simple unbiased filter to cancel out DC components and extract just significant discriminating information present in the phase content of an iris pattern. The encoder may compress the iris pattern into fewer bits (e.g., the iris code may use just one-half bit counts of current iris code methods. The encoder approach may be staged into multiple independent steps thus allowing flexibility in producing code bits to an extent to make a match without having to compute all of the bits, and some of the encoder approach steps may be executed at an early stage during segmentation to save on the computation load.

The present approach and system may extract and encode the most discriminating information present in an iris pattern using a straightforward approach that extends upon the Haar wavelet filters to any form of a symmetric waveform. The approach may start with a feature vector, i.e. intensity function as a function of radial variable extracted from the iris image at each angle. The feature vector may be interpolated to generate a radial resolution covering the features of the iris pattern between the two iris borders at specified angles. Then one may dot product the extracted feature vector by a single periodic filter. Various waveforms may be used to construct the filter with an emphasis that the symmetric waveform sums to zero to cancel out any DC components and eliminate unbiased results (e.g., a Gabor filter may suffer from this kind of bias). One may then capture the phase content of the feature vector by computing the sum over a shifted segment/window (i.e., window width equals the waveform time period) corresponding to the selected center frequency. Thus, an iris template may be generated as a compressed version of the generated phasor feature elements. The summed feature vector elements may be sign quantized so that a positive value is represented as 1, and a negative value as 0 (or vice versa). This may result in a compact biometric template consisting of half counts of bits of related art encoding approaches. Additional bits may also be generated by repeating the same procedure using shifted versions of the filter.

The present approach may start with the feature vector extracted from the iris image at each angle. The feature vector may be interpolated to generate the radial resolution covering the features of the iris pattern between the two iris borders at the specified angle. Then one may dot product the extracted feature vector by a single periodic filter. Various waveforms may be used to construct the filter with an emphasis that the symmetric waveform sums to zero to cancel out any DC components and eliminate unbiased results. Then one may capture the phase content of the feature vector by computing the sum over a shifted segment/window (window width equals to the waveform time period) corresponding to the selected center frequency. Thus, an iris template may be generated as a compressed version of these generated phasor feature elements. The summed feature vector elements may be sign quantized so that a significant positive value is represented as 1, a significant negative value as 0, and insignificant value close to zero is defined by an unknown bit as an x. This may result into a more accurate presentation of the iris patterns by excluding the uncertain bits associated with noise and interference distortions. Additional bits may also be generated by repeating the same procedure using shifted versions of the filter.

To compress an image, one may encode it. The may be a map, having radial resolution versus angular resolution. The radial resolution ($R_R$) may have a 100 points and the angular resolution ($A_R$) may have 360 degrees. However, one may do just every other degree going completely around the eye to end up with 180 degrees for the angular resolution. The map may be of an iris. The radial marks on the iris may be decimated or interpolated.

The size of the data may be $R_R \times A_R$ bytes. Each pixel may be a byte with, for instance, 8 bits per byte. A goal of the encoding may be to compress data down to small quantity or size. The present invention or approach could take the image and run it through a log Gabor wavelet to result in a compressed image with a sign of two outputs—real and imaginary which may be done in the related art. Unlike that art, the present invention may do the analysis or encoding just on the radial axis for each angle. One may have radial values extracted at each angle and at the specific radial resolution.

Encoding may be done at the same time as the segmentation. One may have three outcomes (i.e., 0, 1 and unknown (x) for bit representation. The related art may just have two outcomes, 1 and 0, and assign a value of 1 or 0, which is a strong indication for a weak representation of values that at the transition from positive to negative or vice versa. The present system may realistically place a value, as it appears, which is a 1, 0, or an unknown x for the insignificant values approaching zero. It may be better to note just the strong values and ignore the insignificant as signs can vary dramatically at values close to zero. Further, the present encoding scheme may deal with just one dimension and not two. The information here may be on a string or the radial of the material to be mapped and encoded.

Iris encoding may be a key component of an iris recognition system and may be used to extract the key features of the iris texture into fewer bits which are then used to match the subjects. The matching may be significantly influenced by many factors including the segmentation, feature extraction, spatial resolution and image quality. The present approach may extract and encode the most discriminating information present in an iris pattern. The present feature extraction and encoding scheme may be embedded within the 1D POSE segmentation to reduce sources of errors and allow for staged matching for fast iris indexing. With the present approach, just the significant features of the iris texture are to be encoded so that comparisons between templates may be made fast and unbiased.

The present approach may be based on a 1D analysis. A 1D feature may be advantageous over the 2D feature extraction in terms of computation and robustness. To avoid unbiased features, one may convolve the filters only in the radial axis. Convolving the filters in both directions at different scales may degrade performance. The radial direction may have most of the crucial information and preserve iris information regardless whether the pupil is dilated or not. On the other hand, convolving the filters on the angular direction may be affected by the occlusions of the iris as well as by the undersampling of the iris map. The present system may deploy a one-dimensional approach applied in a radial direction. As part of the POSE segmentation technique, the intensities may be convolved by a step function. So the feature extraction may be may be combined with the segmentation into a single step and thus reduce computation.

Decomposition of the intensity values may be accomplished by using a new set of filters as an extension to 1D Haar wavelet functions or step function where the emphasis is made to construct a periodic one to extract quadratic information of the intensity variations. The filter outputs may then be binarized based on the sign values to present the real and imaginary parts of the equivalent Gabor filters without constructing Gabor filters.

The present approach may be staged into multiple steps that permit fast and quick matches without processing the entire iris code. The approach may allow extracting additional iris code to characterize the iris texture at different central frequencies and at a higher order complex domain. Extraction of additional bits may be possible with the present approach and may be staged as needed if a match does not occur at the first settings.

Instead of constructing two filters, one may construct one 1D periodic filter (note FIG. 2 which shows filter samples 11 to compute the quadratic phase information of the signal) as an extension to a Haar wavelet or step function, sine wave function or any other form of smooth symmetric functions. The filter may be constructed to have zero sums over its period in order to eliminate DC component accumulations and just phase information will be maintained. Taking just the phase may allow encoding of discriminating textures in two irises, while discarding effects due to illumination variations which are inherited in the amplitude information. Phase information rather than amplitude information may provide reliable characteristics of digital images. The amplitude component may often represent the illumination variation and be heavily affected by noise.

Decomposition of the intensity signal may be accomplished with the following items. Convolution may be effected using a filter of a single period wave and having a central frequency specified by the period T. The dot product of the signal and the filter may be constructed to generate an output signal, $$y(r)=I_\theta(r)\bullet f(r)$$

The signal $I_\theta(r)$ may denote the intensity signal extracted at each angle as a function of the radius values. These may be interpolated image intensity values between the two boundaries of the iris and be sampled to a predefined number of radius samples $N_r$. The function $f(r)$ may represent the filter function of length $N_r$.

Figure 3:
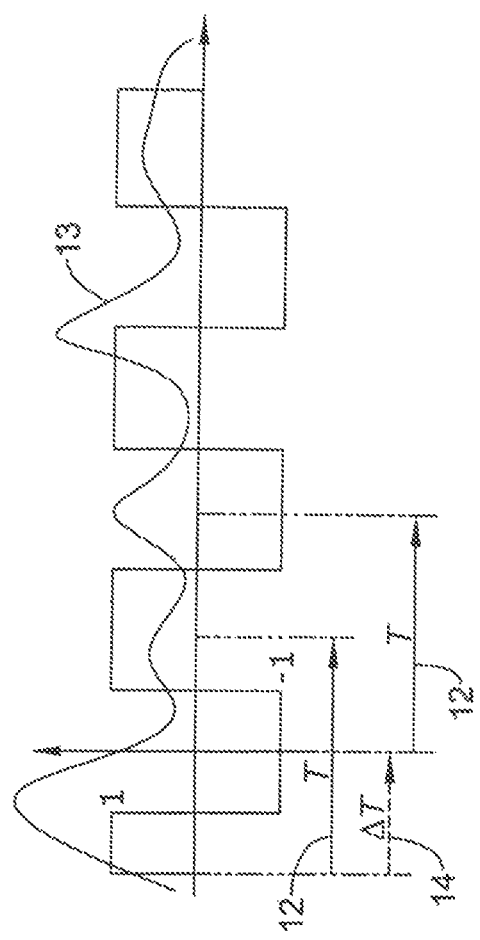
FIG. 3 is a diagram showing a construction of the even odd components of a signal.

One may sum over a "T" period 12 of the output signal 13 using a single, two shifted sum 14 (that constitutes the even and odd symmetry components of the intensity signal) or be even more based upon multiple shifts as shown in FIG. 3. This process may result into two output signals, i.e., if two shifts deployed, as a function of just the phase information while amplitude information is being canceled because of the nature of the symmetry inherited in the filter signal. FIG. 3 is a diagram showing a construction of the even odd components of the signal in a single step. The shifting $\Delta T$ 14 may be any fraction of the period T 12. To match the quadratic output of a Haar Wavelet or Gabor quadratic imaginary and real outputs, one may set it to half of the period T, $\Delta T=T/2$. A sign function may then be used to binarize the filtered values thus present the two possible values by a 0 or 1 bit, resulting into four possible quadratic values equivalent to real and imaginary components constructed by a Gabor filter output.

Unlike the Gabor or wavelet approach, the present approach may allow splitting the outputs into two or more stages for quick indexing. Since the quadratic information may be computed using separate functions, one can stage the encoding approach using first the non-shifted function and then computing an iris code having the same size as the iris map, i.e., $N_r \times N_\theta$. The mask matrix may also be constructed at this smaller size than previously done. There appears to be no need to duplicate the mask size as done in a known Daugman encoding approach. Unlike a related art approach, one may use the present approach to extract additional codes as needed based upon filter outputs of different period shifts, as well as scaled periods for different central frequencies if a match does not occur. The approach may provide flexibility to stage the matching process and allow extraction of fewer bits to make a match.

Encoding may be a way to compress the most discriminating information present within the iris map into fewer bits so that comparisons between templates can be made real-time. One may make use of multi-band decomposition of the iris map to extract the fine and coarse information content of the iris distinctive patterns. A present method for iris feature encoding may be presented in several algorithms.

Wavelets may be used to decompose the iris map into bank of filters to extract wavelet coefficients at different resolutions. Wavelet coefficients may then be encoded at each band to compress the map into fewer bits representing the iris signature. An advantage of using wavelet is that it may be well localized in both spatial and frequency domain.

As to the Gabor/Log Gabor wavelet, Daugman appeared to make use of a two-dimensional (2D) Gabor filter to encode iris maps. A Gabor filter may be built on the basis of sine cosine wave modulation with a Gaussian waveform. This may make it as a special case of a wavelet and thus it can indeed localize features in both spatial and frequency domains.

Decomposition of an image may be accomplished using a quadrature pair of Gabor filters with real parts associated with the cosine modulation and the imaginary part associated with the sine modulation. The sign of the real and imaginary parts may be used to quantize the phase information into four levels using 0/1 bits for positive/negative signs of each of the real and imaginary components.

The Haar wavelet may be a simplified version of a wavelet transform to extract features from the iris map. Gabor and a like wavelet may require many parameters for setting and configuration.

In the options, four levels may be represented using the two bits of data, so each pixel in the iris map corresponds to two bits of data in the iris barcode (template). A total of NrxNqx2xL bits may be calculated for each barcode. L=number of bands, Nr and Nq indicate the size of the iris map.

Figure 2:
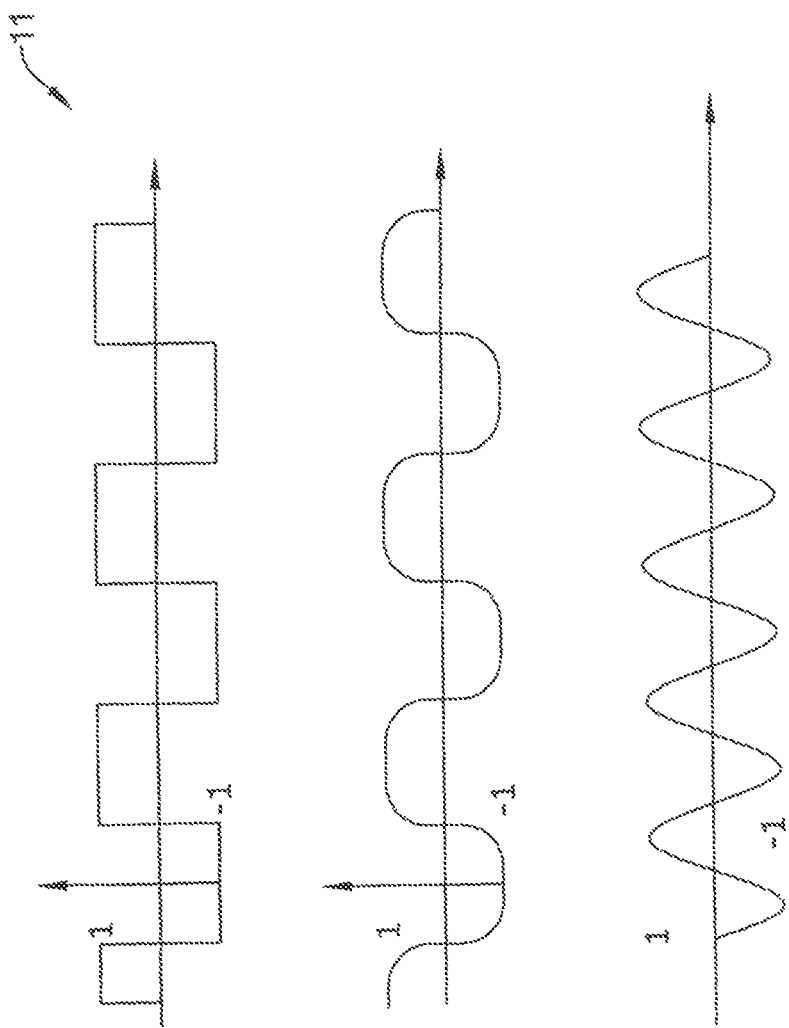
FIG. 2 is a diagram of waveforms that may be used relative to a filter in conjunction with an encoding scheme.

The present encoding scheme may be applied to a 1D signal using radial signal rather than a 2D map. A three bit representation may be used rather than a two bit representation. One may extract as many bits (i.e., blocks of bits) as needed to quantify the information in the phasor only (i.e., no amplitude). This may be important when there are limited iris region due to obscuration (fewer bin comparisons). Thus, the more bit blocks that are extracted, then better matching may be expected. In addition, one may choose to use simple form waveforms (as shown in FIG. 2) which may be simpler designs than Gabor or any wavelet forms with only period as a single parameter.

Three-bit representation may be used in the present schemes. In other approaches, the feature vector may be sign quantized so that any positive value is represented by 1, and negative value by 0. However, in the present approach, the quantization may use three levels, in that a positive value is represented by 1, a negative value is represented by 0, and a value close to zero, i.e., $\leq \upsilon$(tolerance), is represented by x (unknown). An unknown bit may be either 0 or 1.

The present approach and system may utilize various schemes of encoding. One scheme may be like the related art except that one may modify its technical approach to include three outcomes from the encoder rather than two outcomes as in the related art. The present encoding scheme may be applied to a one-dimensional (1D) signal using a radial signal rather than a 2D map.

Figure 4:
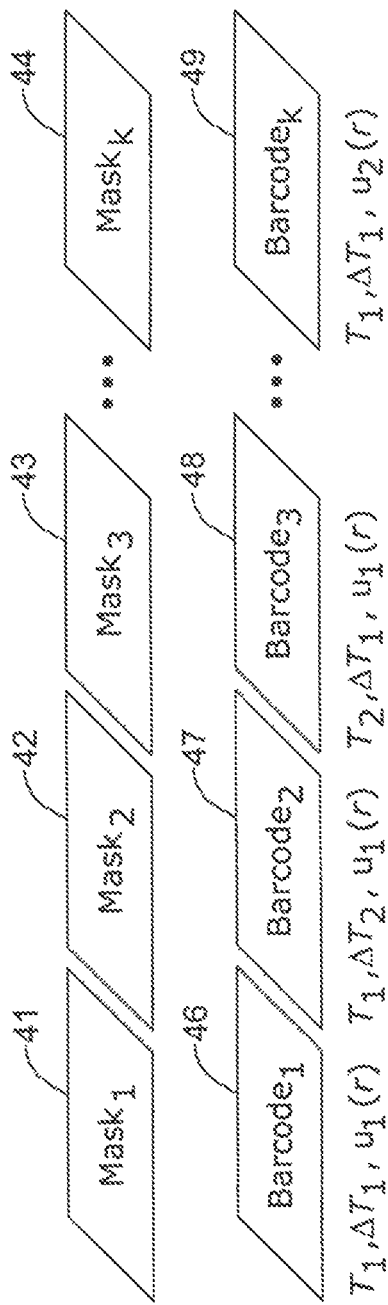
FIG. 4 shows a basic mask and barcode layout for an encoding algorithm.

The iris encoding scheme may have options of waveforms. Using one of the present algorithms, one may extract as many bit blocks as wished based on the following variations of the first, second and third algorithms, respectively. For any period selection, one may obtain a new set of bits; for any shift of the period, one may obtain a new set of bits; and for any wavelength, one may obtain a new set of bits. A fourth algorithm may result into a single block of bits. FIG. 4 is a diagram showing a basic mask and barcode layout applicable for some of the algorithms. The layout may include a set of masks 41, 42, 43 and 44 and corresponding barcodes 46, 47, 48 and 49. Waveform information, relative to the masks and barcodes 1, 2, 3 ... k, is indicated by $T_1, \Delta T_1, u_1(r), T_1, \Delta T_2, u_1(r), T_2, \Delta T_1, u_1(r), \ldots T_1, \Delta T_1, u_2(r)$, respectively.

A signal may be convoluted. One may get scores for each value of the waveform. A convolution result or output may be f(r). If f(r) is greater than gamma (γ), then it may be one; if it is less than gamma, then it may be zero; and if it is within gamma or less than gamma, then it may be unknown (x). An unknown measure of a pixel may be masked as the masked information may be unknown. Again, this analysis may be done just on the radial one dimension.

One may run a sign test and end up with just one bit per value and save 50 percent on a use of bits. If the signal is not sufficiently discriminant for a match, then one may do a shift to get another bit. Convolution may be done on a shifted version of the same wavelength. Shift $\Delta T$ may equal $T/2$.

A general form to convolve with a shifted version of the same waveform may be $$f(r_k) = I(r) * u(r - \Delta T_k)$$

where I(r) is an intensity vector and * is the convolve symbol.

A goal is to have one bit, but if one does not get a match, one may increase it to two, three or more bits until a match is obtained. In a closed form, the unknown notion of 1, 0, x, may be used for an outcome. The complete period of a signal may be used. For each shifting, the sign test may be performed. The waveform may be generalized.

Figure 5:
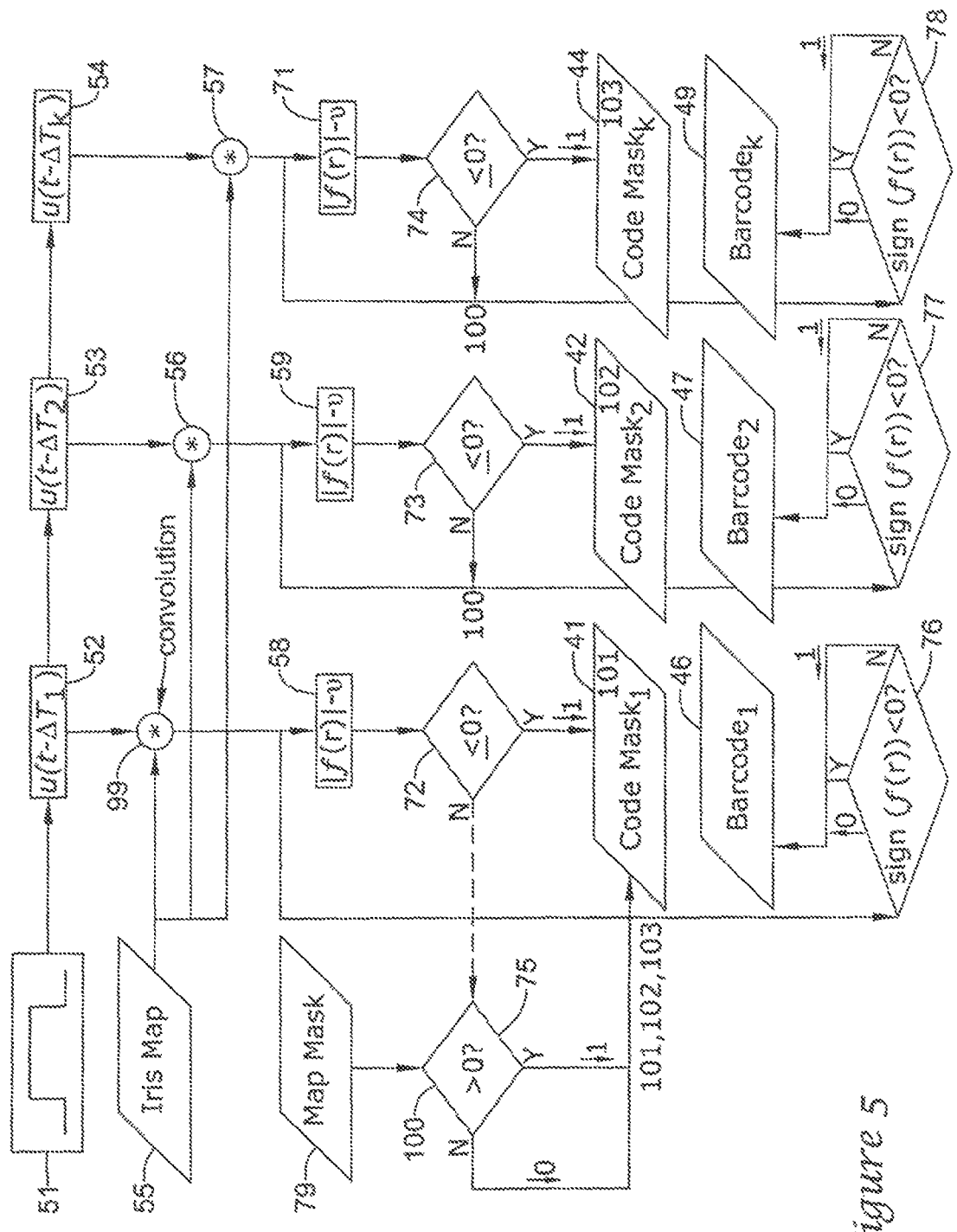
FIG. 5 is a diagram of an encoding approach using convolution.

FIG. 5 is a diagram of the encoding approach using a first algorithm. One may base the iris encoding on a single waveform filter which is either odd or even symmetric. Then one may make use of circular shifted version of the waveform to obtain additional contents of the data. Rather than using Gabor, may make use of the step function as the symmetric waveform to be convolved with 1D radial signal. Unlike Gabor, (often used in existing art), one may use step symmetric waveform because it cancel out the DC components. Mathematically, this may be deduced to simple difference among integrals of the actual values of the intensity function. For example, using one shift of half period, the formulation can be simplified as noted in the following.

$f(r) = I(r) * u(r)$, where $f(r)$ may be a result of a convolution, I(r) is an operator and * indicates convolving. u(r) may indicate for an example a step function 51 as shown in FIG. 5. The following may lead to a sign test.

$$\Rightarrow f(r) = \int_{-T/2}^{T/2} I(r) dr - \int_{-T}^{-T/2} I(r) dr - \int_{+T/2}^{T} I(r) dr \gtreqless \gamma$$

$$\Rightarrow b(r) \begin{cases} = 1 & \text{if } f(r) >> \gamma \\ = 0 & \text{if } f(r) << -\gamma \\ = x & \text{if } |f(r)| \approx \text{or} < \gamma \end{cases}$$

Note that "x" means "unknown" which means that the pixel has to be masked in the barcode and it is not relevant to set it to either 0 or 1. The same applies to a shifted version of u(r).

For $\Delta T = T/2$, one may have $$f(r) = \int_0^T I(r) dr - \int_{-T}^0 I(r) dr \gtreqless \gamma.$$

FIG. 5 shows a diagram with a step function input 51 to a block 52, which has an output to block 53, which in turn has an output to block 54. Blocks 52, 53 and 54 represent $u(t - \Delta T_1)$, $u(t - \Delta T_2)$, and $u(t - \Delta T_k)$, respectively. "k" may be 3 or some other number according to how many of the $u(t - \Delta T_k)$ blocks may be had. This approach using "k" may be application to other components and/or symbols of the present Figure and the other Figures referred to herein. Outputs from blocks 52, 53 and 54 may go to convolution operators 99, 56 and 57, respectively. Also input to each of the operators may be an output from the iris map 55. Outputs from operators 99, 56 and 57 may go to blocks 58, 59 and 71, respectively, each representing (|f(r)|−υ). The outputs from operators 99, 56 and 57 may also go to diamond symbols 76, 77 and 77, respectively, that ask a question, "sign (f(r))<0?". Outputs from blocks 58, 59 and 71 may go to diamond symbols 72, 73 and 74, respectively, which ask the question, "≦0?" Map mask 79 may have an output to a diamond symbol 75, which asks the question, "mask$_\theta$(r)>0?" A "yes" answer from diamond 72, 73 or 74 may go as a one to a code mask 41, 42 or 44, respectively. A "no" answers from one of diamond symbol 72, 73 or 74 may go to the diamond symbol 75. If an answer from symbol 75 is yes, then a one may go to code mask 41, 42 or 44, respectively. If an answer from symbol 75 is no, then a zero may go to code mask 41, 42 or 44, respectively. With respect to diamond symbol 76, 77 or 78, if an answer is yes, then a zero may go to the barcode 46, 47 or 49, respectively. If an answer from symbol 76, 77 or 78 is no, then a one may go to the barcode 46, 47 or 49, respectively.

Figure 6:
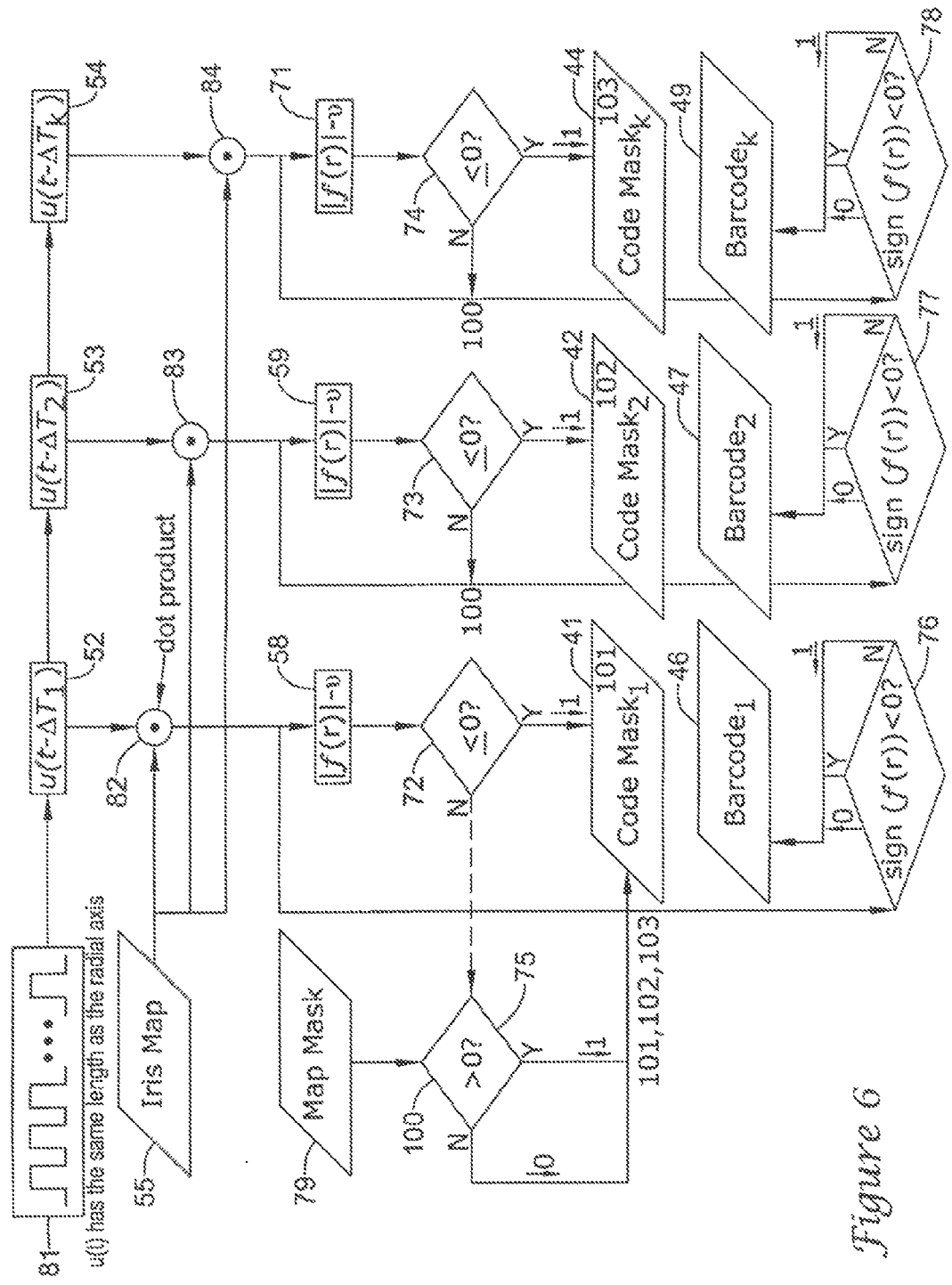
FIG. 6 is a diagram of an encoding approach using a dot product.

Another approach or scheme of encoding would not use convolution of FIG. 5 but a dot product as indicated in FIG. 6. One may take the wavelength and the dot product and use the sign test. To convolve is not needed in the version of FIG. 6. The same test may be used to come up with the three bits. A shift may be done to get more bits. More bins may be obtained for all T, to get more global stretch wavelength, wider, and get a new set of codes. One may stretch or squeeze. For a new wavelength, a different set of codes may be obtained. For all T one may get different codes for different frequencies. The algorithm deploys a dot product on the signal with a periodic filter.

$$f(r) = \int_{-T/2}^{T/2} I(r) \cdot u(r) dr - \int_{-T}^{-T/2} I(r) \cdot u(r) dr - \int_{+T/2}^{T} I(r) \cdot u(r) dr \gtrless \gamma$$

$$\Rightarrow b(r) \begin{cases} = 1 & \leftarrow f(r) \gg \gamma \\ = 0 & f(r) \ll -\gamma \\ = x & |f(r)| < \text{or} \approx \gamma \end{cases}$$

The preceding may be regarded as a sign test for a bit. The following might be noted.

∀ΔT, one may obtain a new set of bins based upon demand. It is probably adequate to run the scheme algorithm only once to make a match.

∀T$_1$, one may obtain a new set of codes based upon frequency content.

∀ wavelength, one may obtain a new set of codes based upon the peaks attenuation.

FIG. 6 shows a diagram with a square waveform (having a somewhat constant period) input 51 to a block 52, which has an output to block 53, which in turn has an output to block 54. u(t) may have the same length as a radial axis. Blocks 52, 53 and 54 represent u(t-ΔT$_1$), u(t-ΔT$_2$), and u(t-ΔT$_k$), respectively. "k" may be 3 or some other number according to how many of the u(t-ΔT$_k$) blocks may be had. This approach using "k" may be application to other components and/or symbols of the present Figure and the other Figures referred to herein. Outputs from blocks 52, 53 and 54 may go to dot product operators 82, 83 and 84, respectively. Also input to each of the operators may be an output from the iris map 55. Outputs from operators 82, 83 and 84 may go to blocks 58, 59 and 71, respectively, each representing (|f(r)|−υ). The outputs from operators 82, 83 and 84 may also go to diamond symbols 76, 77 and 77, respectively, that ask a question, "sign (f(r))<0?". Outputs from blocks 58, 59 and 71 may go to diamond symbols 72, 73 and 74, respectively, which ask the question, "≦0?". Map mask 79 may have an output to a diamond symbol 75, which asks the question, "mask$_\theta$(r)>0?". A "yes" answer from diamond 72, 73 or 74 may go as a one to a code mask 41, 42 or 44, respectively. A "no" answers from one of diamond symbol 72, 73 or 74 may go to the diamond symbol 75. If an answer from symbol 75 is yes, then a one may go to code mask 41, 42 or 44, respectively. If an answer from symbol 75 is no, then a zero may go to code mask 41, 42 or 44, respectively. With respect to diamond symbol 76, 77 or 78, if an answer is yes, then a zero may go to the barcode 46, 47 or 49, respectively. If an answer from symbol 76, 77 or 78 is no, then a one may go to the barcode 46, 47 or 49, respectively.

Figure 7:
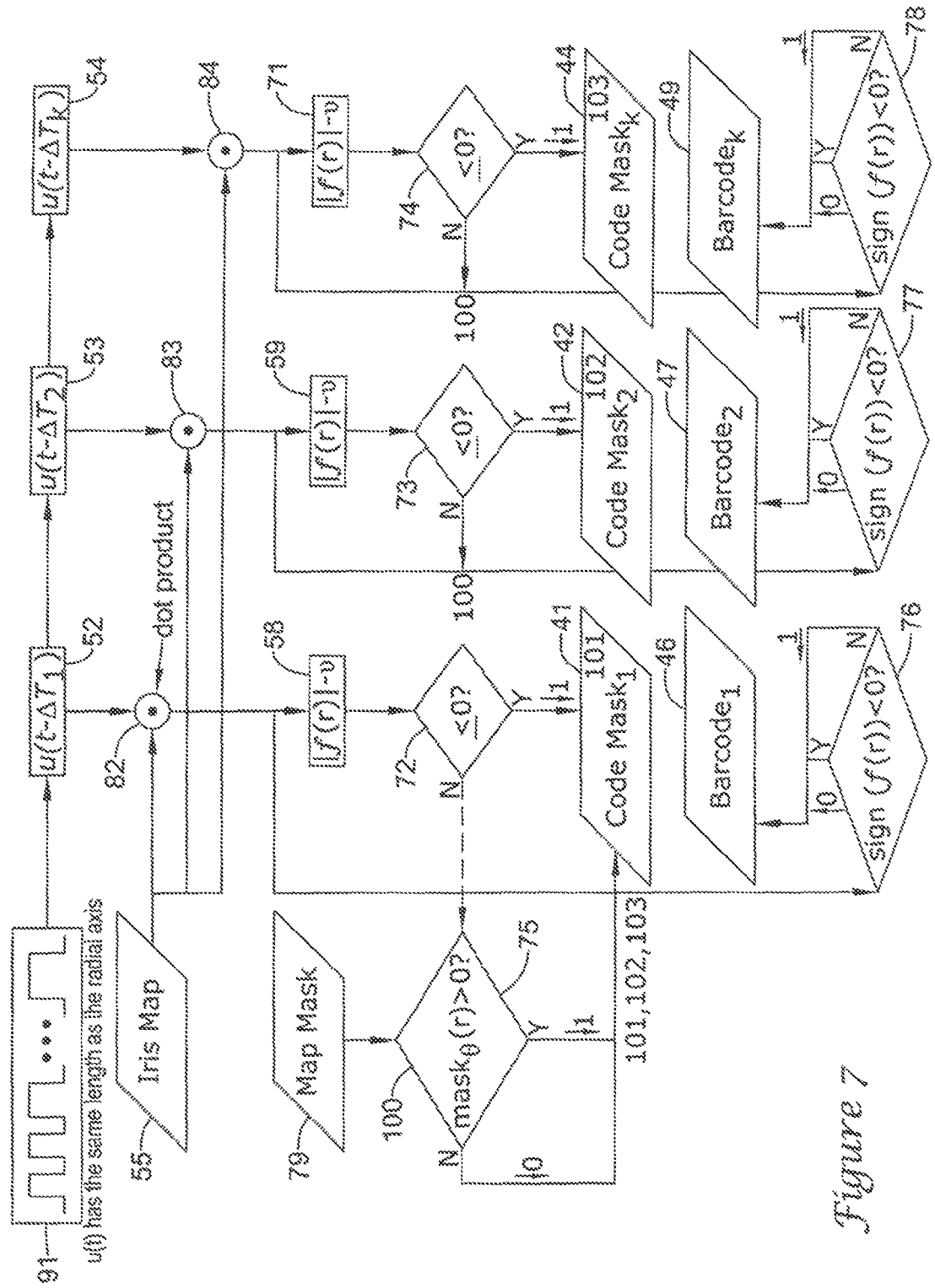
FIG. 7 is a diagram of an encoding scheme using a binning approach.

In another approach or scheme, one might "bin it", having a waveform 91 as shown in FIG. 7, which may reveal non-uniform binning. Smaller bins may be made at the inner bounds of the iris because there is more information closer to the pupil. Thus, a smaller bin may be utilized. This approach may be tied into an amount of coverage. An integral may be used starting from a given period to a certain T, and then the difference be compared of earlier on. A sign of being bigger may be a 1, being smaller a 0, or not known an x.

The scheme may be based on bins (i.e., binning approach) which determine the localized features of a signal within the bins. The bins may be shown to have a length T. The bins do not necessarily have to be uniform. For instance, one may chose to have smaller bins at the vicinity of the inner bound and larger bins at the outer bound (where the SNR is expected to be smaller).

FIG. 7 shows a diagram with a square waveform (having a varying period) input 91 to a block 52, which has an output to block 53, which in turn has an output to block 54. u(t) may have the same length as a radial axis. Blocks 52, 53 and 54 represent u(t-ΔT$_1$), u(t-ΔT$_2$), and u(t-ΔT$_k$), respectively. "k" may be 3 or some other number according to how many of the u(t-ΔT$_k$) blocks may be had. This approach using "k" may be application to other components and/or symbols of the present Figure and the other Figures referred to herein. Outputs from blocks 52, 53 and 54 may go to dot product operators 82, 83 and 84, respectively. Also input to each of the operators may be an output from the iris map 55. Outputs from operators 82, 83 and 84 may go to blocks 58, 59 and 71, respectively, each representing (|f(r)|−υ). The outputs from operators 82, 83 and 84 may also go to diamond symbols 76, 77 and 77, respectively, that ask a question, "sign (f(r))<0?". Outputs from blocks 58, 59 and 71 may go to diamond symbols 72, 73 and 74, respectively, which ask the question, "≦0?". Map mask 79 may have an output to a diamond symbol 75, which asks the question, "mask$_\theta$(r)>0?". A "yes" answer from diamond 72, 73 or 74 may go as a one to a code mask 41, 42 or 44, respectively. A "no" answers from one of diamond symbol 72, 73 or 74 may go to the diamond symbol 75. If an answer from symbol 75 is yes, then a one may go to code mask 41, 42 or 44, respectively. If an answer from symbol 75 is no, then a zero may go to code mask 41, 42 or 44, respectively. With respect to diamond symbol 76, 77 or 78, if an answer is yes, then a zero may go to the barcode 46, 47 or 49, respectively. If an answer from symbol 76, 77 or 78 is no, then a one may go to the barcode 46, 47 or 49, respectively.

Figure 8B:
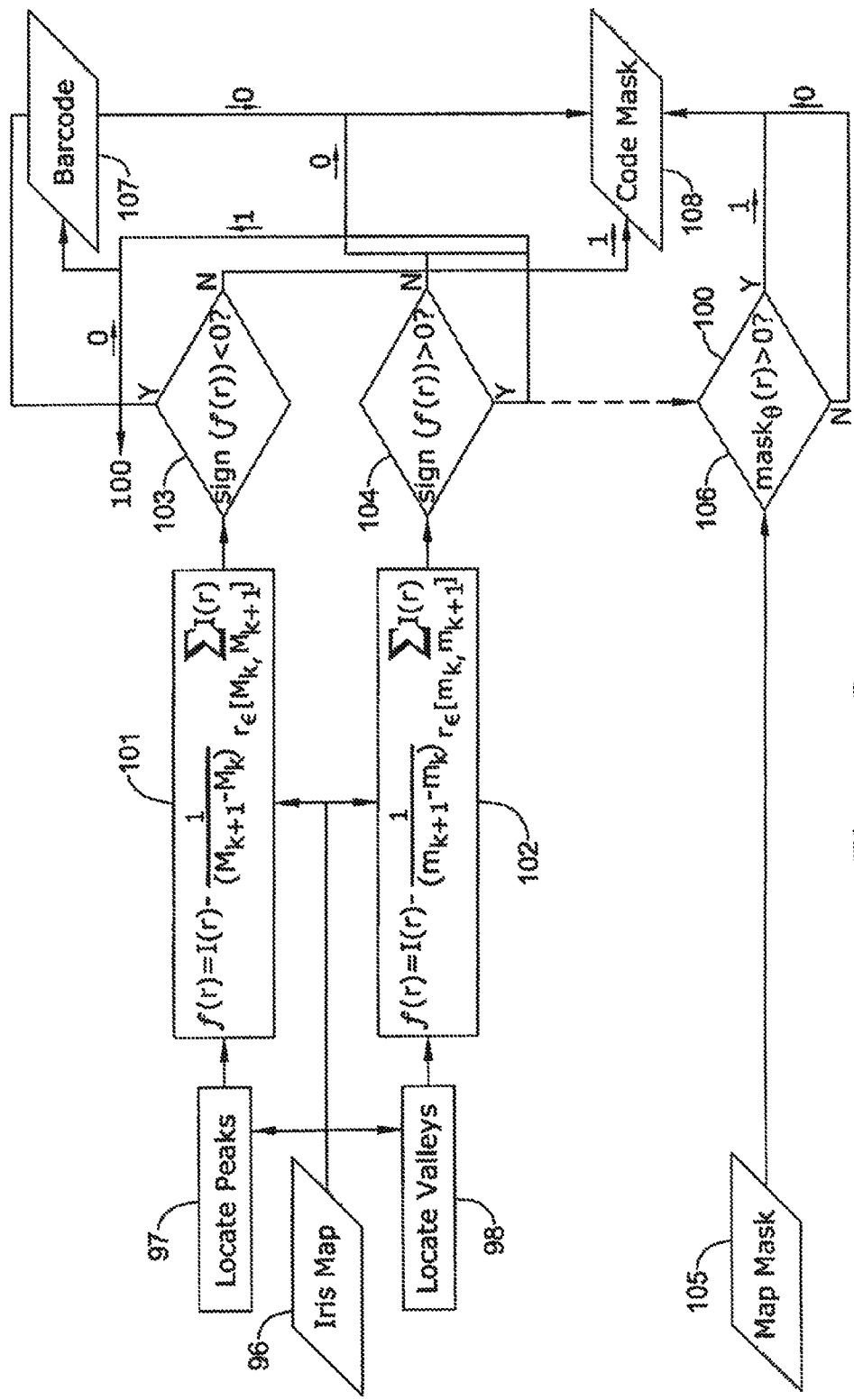

In another approach or scheme, as indicated in FIGS. 8a and 8b, one may have ∀f(r)=I(r)−ΣI(r) within the two valleys. In a sense, $$\forall f(r) = I(r) - \sum_{\substack{within\\valleys}} I(r) \gtreqless \gamma.$$

There may be a move to capture the peaks and valleys, and use 1's for peaks and 0's for valleys with respect to average values. About everything else may be regarded as unknown, i.e., transition areas where f(r) approaches zero.

The binning of the barcode may be based upon the local minima 92 and maxima 93 of the radial signal per each angle, as shown in a graph 94 of FIG. 8*a*. Also, the values 95 in each bin are indicated as 1 (one), 0 (zero) and x (unknown). Several criteria may be noted in the following.

$$f(r) = I(r) - \frac{1}{(M_{k+1} - M_k)} \sum_{r \in [M_k, M_{k+1}]} I(r) \quad (101)$$

$$\Rightarrow b(r) = \begin{cases} 0; & \text{if } f(r) < 0 \\ x; & \text{if } f(r) \geq 0 \end{cases}$$

$$f(r) = I(r) - \frac{1}{(m_{k+1} - m_k)} \sum_{r \in [m_k, m_{k+1}]} I(r) \quad (102)$$

$$\Rightarrow b(r) = \begin{cases} 1; & \text{if } f(r) > 0 \\ x; & \text{if } f(r) \leq 0 \end{cases}$$

When there are two outcomes for the same pixel, the confirmed bits may be selected over the unknown bit choice.

FIG. 8*b* is a diagram of another algorithm noted herein. An iris map 96 which has its peaks 97 and valleys 98 located. These located peaks and valleys and other map 96 information may have equations 101 and 102, respectively, applied to them. The results from equations 101 and 102 may go to diamond symbols 103 and 104, which asks a question, "sign (f(r))<0?" A map mask 105, corresponding to iris map 96, may have an output to a diamond symbol 106, which asks a question, "mask$_\theta$(r)>0?" If an answer to the question of symbol 106 is yes, then a one may go to a code mask 108, and if the answer is no, then a zero may go to the code mask 108. If an answer to the question of symbol 103 is yes, then a zero may go to a barcode 107 and symbol 106, and if the answer is no, then a one may go to the code mask 108. If an answer to the question of symbol 104 is yes, then a one may go the barcode 107 and the symbol 106, and if the answer is no, then a zero may go to the code mask 108.

An analysis (i.e., encoding) may be performed on the radial axis per each angle.

$$f(r)=I(r)*u(r)$$

⇒ Sign Test ⪌ γ
⇒ 0/1 or x.

To obtain additional bits per each pixel value, $$f(r)=I(r)*u(r-\Delta T_k).$$

The three bit approach may be regarded as a trick to eliminate much noise. It may be good for f(r) values as they are considered as unknown since a value is not assigned to it. As to an unknown, a separate weight may be assigned. The weight may vary between from low to high but not be a 100 percent of either extreme since that would amount to one of the other two values. This weighting approach may handle the encoding uncertainty or noise but not the segmentation noise.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. An encoding method comprising:
   capturing an image of an iris with a digital camera;
   employing an iris recognition system to segment the captured image, wherein segmentation isolates an annular iris from the remainder of the captured image;
   extracting a feature vector from an iris pattern at each of several one-dimensional radial segments;
   dot product-ing each feature vector with a periodic filter;
   encoding the feature vectors; and
   compressing the encoded iris pattern to fewer bits but sufficient to make a match.

2. The method of claim 1, further comprising embedding the extracting and encoding into segmentation.

3. The method of claim 1, wherein dot product-ing the feature vectors detects significant features of the iris pattern.

4. The method of claim 1, wherein the encoding is effected in stages.

5. The method of claim 1, wherein the encoding is effected in stages with single bits.

6. The method of claim 5, wherein the bits are sign quantized with a positive, negative or an unknown value.

7. The method of claim 5, wherein additional bits are added to improve matching of features of the iris pattern.

\* \* \* \* \*